(12) United States Patent
De Filippis et al.

(10) Patent No.: US 10,084,904 B2
(45) Date of Patent: *Sep. 25, 2018

(54) CLOUD MESSAGING BETWEEN AN ACCESSORY DEVICE AND A COMPANION DEVICE

(71) Applicant: Apple Inc., Cupertino, CA (US)

(72) Inventors: Pierre J. De Filippis, San Jose, CA (US); Nicholas J. Circosta, Mountain View, CA (US); Daniel B. Pollack, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,246

(22) Filed: Jul. 7, 2017

(65) Prior Publication Data

US 2017/0359457 A1 Dec. 14, 2017

Related U.S. Application Data

(63) Continuation of application No. 15/179,510, filed on Jun. 10, 2016, now Pat. No. 9,736,290.

(51) Int. Cl.
| | |
|---|---|
| *H04B 7/00* | (2006.01) |
| *H04M 1/725* | (2006.01) |
| *H04W 4/00* | (2018.01) |
| *H04L 29/08* | (2006.01) |
| *H04W 76/02* | (2009.01) |
| *H04W 76/14* | (2018.01) |
| *H04W 4/80* | (2018.01) |
| *H04W 88/02* | (2009.01) |

(52) U.S. Cl.
CPC ...... *H04M 1/7253* (2013.01); *H04L 67/1097* (2013.01); *H04W 4/008* (2013.01); *H04W 4/80* (2018.02); *H04W 76/023* (2013.01); *H04W 76/14* (2018.02); *H04W 88/02* (2013.01)

(58) Field of Classification Search
CPC ... H04W 4/008; H04W 76/023; H04W 88/02; H04W 1/7253
USPC .................................. 455/41.3, 41.2
See application file for complete search history.

(56) References Cited

U.S. PATENT DOCUMENTS 8,594,632 B1 * 11/2013 Azizi ................... H04W 12/06
455/411
2013/0109371 A1 5/2013 Brogan et al.
(Continued)

FOREIGN PATENT DOCUMENTS

WO WO2015103048 A1 7/2015

*Primary Examiner* — April G Gonzales
(74) *Attorney, Agent, or Firm* — Meyertons Hood Kivilin Kowert & Goetzel, P.C.; Jeffrey C. Hood

(57) ABSTRACT

A companion device (e.g., smart phone) and an accessory device (e.g., wearable device) may be configured to communicate messages to each other to flexibly share information, such as emails, text messages, calendar notifications, and media library items. This communication may occur through a direct connection (e.g., Bluetooth) and when the devices are connected to a common Wi-Fi access point. When these direct and common infrastructure connections are not available, the devices may communicate messages between them using a cloud server. This cloud server message communication may advantageously enable the companion device and the accessory device to share messages even when they are physically distant from each other.

20 Claims, 6 Drawing Sheets

(56) References Cited

U.S. PATENT DOCUMENTS

| | | |
|---|---|---|
| 2013/0262298 A1 | 10/2013 | Morley |
| 2014/0172140 A1 | 6/2014 | Buck |
| 2015/0046828 A1 | 2/2015 | Desai et al. |
| 2015/0327180 A1* | 11/2015 | Ryu .................. H04L 1/00 370/329 |
| 2016/0050701 A1* | 2/2016 | Pyattaev ............ H04W 76/14 370/329 |
| 2016/0205555 A1* | 7/2016 | Agiwal .............. H04W 12/04 713/168 |
| 2016/0360341 A1* | 12/2016 | Srivatsa ............ H04L 67/104 |

* cited by examiner

CLOUD MESSAGING BETWEEN AN ACCESSORY DEVICE AND A COMPANION DEVICE

PRIORITY CLAIM

This application is a continuation of Ser. No. 15/179,510 titled "Cloud Messaging Between an Accessory Device and a Companion Device" and filed Jun. 10, 2016, and which is hereby incorporated by reference in its entirety as though fully and completely set forth herein.

FIELD

The present application relates to wireless communication, including enabling an accessory device, such as a smart watch, and a companion device to communicate with each other using cloud messaging.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices commonly take the form of smart phones or tablets, which users often carry on their person or hold. Wearable devices, such as smart watches, are a newer form of mobile electronic device. Wearable devices often work in tandem with a more traditional device (e.g., a smart phone), where the smart phone may perform configuration and/or control functions for the wearable device. Such wearable devices may be referred to as accessory devices, and the corresponding device (e.g., smart phone) which configures or controls the accessory device may be referred to as a companion device.

An accessory device (e.g., a wearable device such as a smart watch) typically communicates with its companion device (e.g., a smart phone). Such communication is readily accomplished when the two device are proximate to each other. For example, the accessory device and the companion device may communicate with each other over Bluetooth, or possibly over Wi-Fi. However, it would also be desirable for the accessory device and the companion device to be able to communicate with each other when they are physically separated by some distance, e.g., a direct connection is not available and they do not share a common infrastructure connection, such as a common wireless access point. Thus, improvements in the field are desirable.

SUMMARY

Embodiments are presented herein of, inter alia, a companion device, such as a smart phone, and an accessory device, such as a smart watch, which are capable of communicating with each other using cloud-based messaging.

The companion device and the accessory device may be configured to communicate messages to each other to share information, such as emails, text messages, calendar information, and media library items, among others. This communication may occur through the use of multiple pipes, i.e., multiple communication mechanisms. For example, messages may be routed between the companion and the accessory device when the devices are directly connected (e.g., via Bluetooth) and when the devices are connected to a common network infrastructure device, such as a common Wi-Fi access point. When these direct and common infrastructure connections are not available, in some embodiments described herein the two user equipment (UE) devices may communicate messages between them using a cloud server. This cloud server message communication may advantageously enable the companion device and the accessory device to share messages even when they are physically distant from each other.

A first set of queues may be configured to pass messages into either a direct connection pipe or a common infrastructure connection pipe. Thus messages in the first set of queues will not be delivered via connection to a cloud server. These messages may be enqueued in these queues according to multiple criteria related to the permissions and/or type of the message to be routed. Additionally, the particular queue to which a message is added may be determined based upon factors such as the priority level of the message or message type.

A second set of queues may be configured to relay messages through the two pipes used by the first set of queues, as well as a 'cloud pipe' for delivery via the cloud server, referred to as a cloud-based connection. This second set of queues may permit eligible messages to be delivered between the devices even when neither a direct connection nor a common infrastructure connection is available. The messaging performed via this cloud pipe may be referred to as "cloud messaging."

The cloud pipe described above achieves greater flexibility in routing messages between the two devices, in particular when the devices are physically distant from each other, and thus more prompt delivery may be achieved. This allows the companion device and the accessory device (e.g., the smart phone and the smart watch) to achieve greater synchronization and consistency in the various user data that they store, providing an improved user experience.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
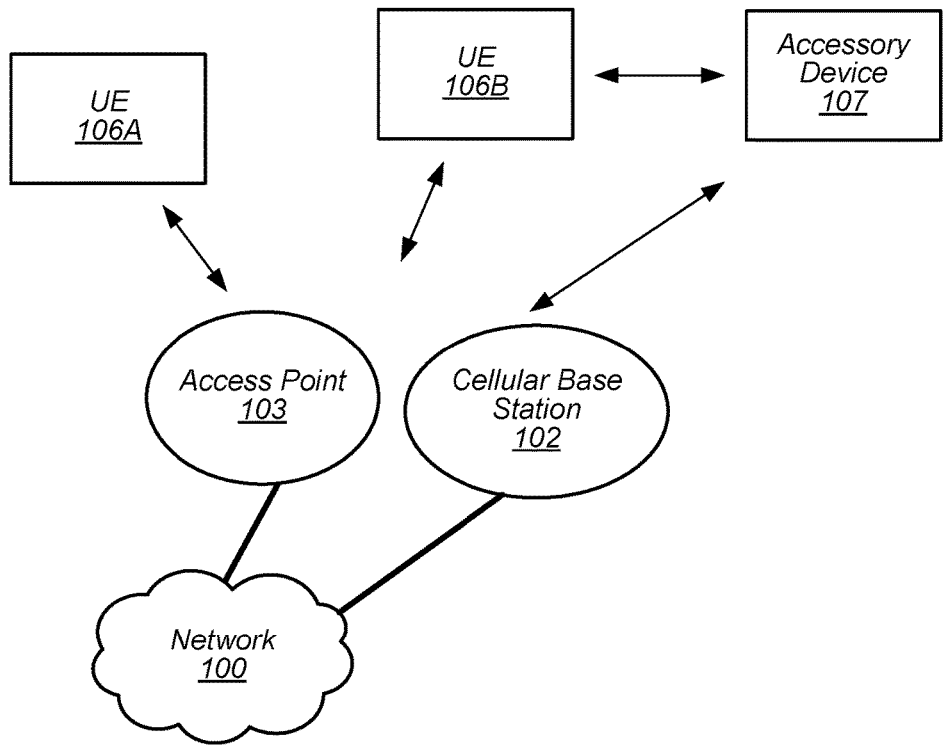
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Access Point (AP)—The term "Access Point" has the full breadth of its ordinary meaning, and at least includes a wireless communication station installed at a fixed location and used to communicate with mobile or stationary wireless devices as part of a wireless communication system, e.g., a Wi-Fi system.

Wi-Fi—refers to short range wireless communication technology, such as that based on IEEE 802.11 wireless standards such as 802.11a, 802.11.b, 802.11g, 802.11n, 802.11-2012, 802.11ac, and/or other IEEE 802.11 standards. IEEE 802.11 technology may be referred to as "Wi-Fi" or "wireless local area network (WLAN)" technology.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes wireless devices 106A, 106B, and 107, which may be user devices and may be referred to herein as "user equipment" (UE) or UE devices. The UE devices 106A, 106B and 107 may be configured to perform cellular communications with a cellular base station 102.

The cellular base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100.

The communication area (or coverage area) of the base station 102 may be referred to as a "cell." Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

The UE devices 106A, 106B and 107 may be configured to communicate with a Wi-Fi network via an access point 103, where the terms "Wi-Fi" and "access point" were defined above. Thus the UE devices 106A, 106B and 107 may be configured to communicate with the same or different access points over the same or different Wi-Fi networks, respectively.

The base station 102 may be configured to communicate over the transmission medium using any of various cellular radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD). The access point 103 may be configured to communicate with the UEs using any of various short range technologies, such as Wi-Fi, WiMAX etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as Wi-Fi capability and/or cellular communications capability. The UE device 107 may be an accessory device to at least one of the UEs, such as UE 106B, wherein the UE 106B may be referred to as a companion device. The accessory device 107 may be any of various types of devices, typically a wearable device that has a smaller form factor, and may have limited battery, output power and/or communications abilities relative to UEs 106. As one common example, the UE 106B (the companion device) may be a smart phone carried by a user, and the accessory device 107 may be a smart watch worn by that same user, or possibly a different user. Thus, as another example, in the operation described herein the UE 106B may be a smart phone carried by a first user, and the accessory device 107 may be a smart watch worn by a second, different user.

The companion UE 106B and the accessory UE 107 may be configured to communicate directly with each other. In other words, the UE 106B and the UE 107 may communicate directly (in a peer-to-peer manner) using any of various short-range communication protocols, such as Bluetooth, Wi-Fi, etc. The term "communicate directly" as used herein refers to direct communication between the two UEs without any intervening access point or base station. One common example of direct communication between the companion device 106B and the accessory device 107 is a Bluetooth communication directly between the two devices in a peer-to-peer manner.

The accessory device 107 may include communications capability, e.g., cellular communication capability, and hence may be able to directly communicate with cellular base station 102. However, since the accessory device 107 is possibly limited in one or more of its communication capabilities, output power, and/or battery, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. Similarly, in some embodiments the accessory device 107 may selectively use the Wi-Fi communication capabilities of the UE 106B to conduct its Wi-Fi communications. The limitation on communication abilities of the accessory device 107 can be permanent, e.g., due to limitations in battery life, output power or the radio access technologies (RATs) supported, or temporary, e.g., due to conditions such as current battery status, inability to access a network, or poor reception.

Figure 2:
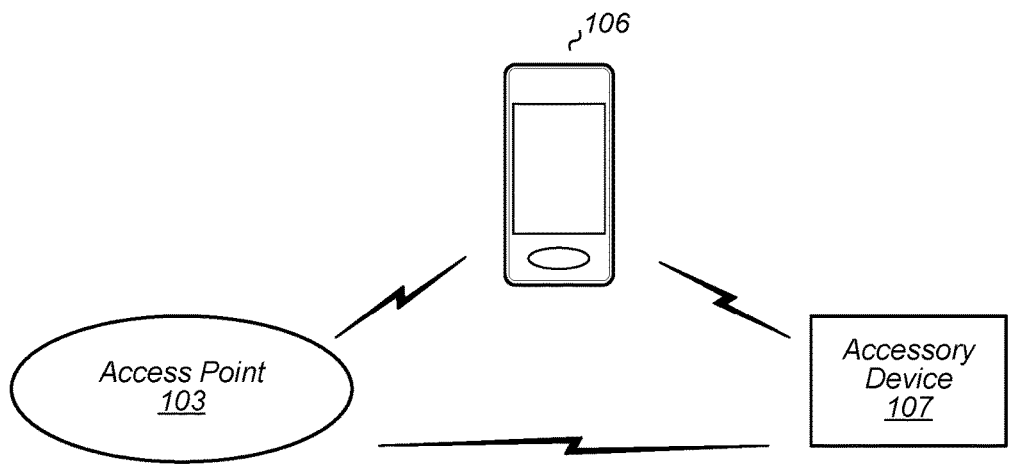
FIG. 2 illustrates an example system in which an accessory device and a companion device can either directly communicate with each other or communicate with each other through a common network infrastructure, such as a Wi-Fi access point, according to some embodiments.

FIG. 2—Example System with Accessory Device and Companion Device

FIG. 2 illustrates an example where the companion UE 106 and the accessory UE 107 are both in communication with access point 103. As noted above, the UE 106 may be a wireless device such as a smart phone. The UE 107 may be a wearable device such as a smart watch. The accessory device 107 may comprise Wi-Fi communication capability and be capable of directly communicating with the access point 103 as shown.

The companion UE 106 and the accessory UE 107 may also be able to communicate with each other in a direct fashion, as shown. For example, the UE 106 and the UE 107 may be configured to communicate with each other over a short range wireless protocol, such as Bluetooth.

In some embodiments it is desirable for the companion UE 106 and the accessory UE 107 to be able to exchange messages (information) so that they have a common or synchronized set of information. For example, if one of the companion UE 106 or the accessory UE 107 receives an email or a text, it may be desirable for the recipient to send the received email or text to the other UE so that both devices have the received email or text. For example, if the user receives an email or text on his smart watch 107, the smart watch 107 may convey the received email or text to the user's smart phone 106 so that both devices have the received communication. Similarly, if the user receives an email or text on his smart phone 106, the smart phone 106 may convey the received email or text to the user's smart watch 107 so that both devices have the received communication. As another example, if the user enters a calendar entry, or receives a calendar invitation for an event, on his calendar application on his smart phone, the smart phone may convey this calendar entry (or calendar invite) to the smart watch so that the calendar applications on both devices are synchronized with the same information.

In some embodiments, when the companion UE 106 and the accessory UE 107 are either physically close enough to be in direct communication, or if they are communicating with a common network infrastructure device (a common Wi-Fi access point), the two devices are able to share these messages as discussed immediately above. If the companion UE 106 and the accessory UE 107 are physically close enough to be in direct communication, then they are able to communicate the above types of messages over a short range communication protocol such as Bluetooth. If the companion UE 106 and the accessory UE 107 are connected to the same Wi-Fi access point, then they are also able to communicate the above types of messages with each other.

However, if the companion UE 106 and the accessory UE 107 are physically separated to an extent such that direct communication is not possible, and if the companion UE 106 and the accessory UE 107 are not connected to the same network infrastructure device (are connected to different Wi-Fi access points), in prior system exchange of the above types of messages has not been possible. For example, if the user walks to a coffee shop with his smart phone, and leaves his smart watch at home (or vice versa), the smart phone 106 and the smart watch 107 are not able to communicate the above messages with each other.

The UEs 106 and 107 may include a processor that is configured to execute program instructions stored in memory. The UEs 106 and 107 may perform any of the method embodiments described herein by executing such stored instructions. Alternatively, or in addition, the UEs 106 and 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

Figure 3:
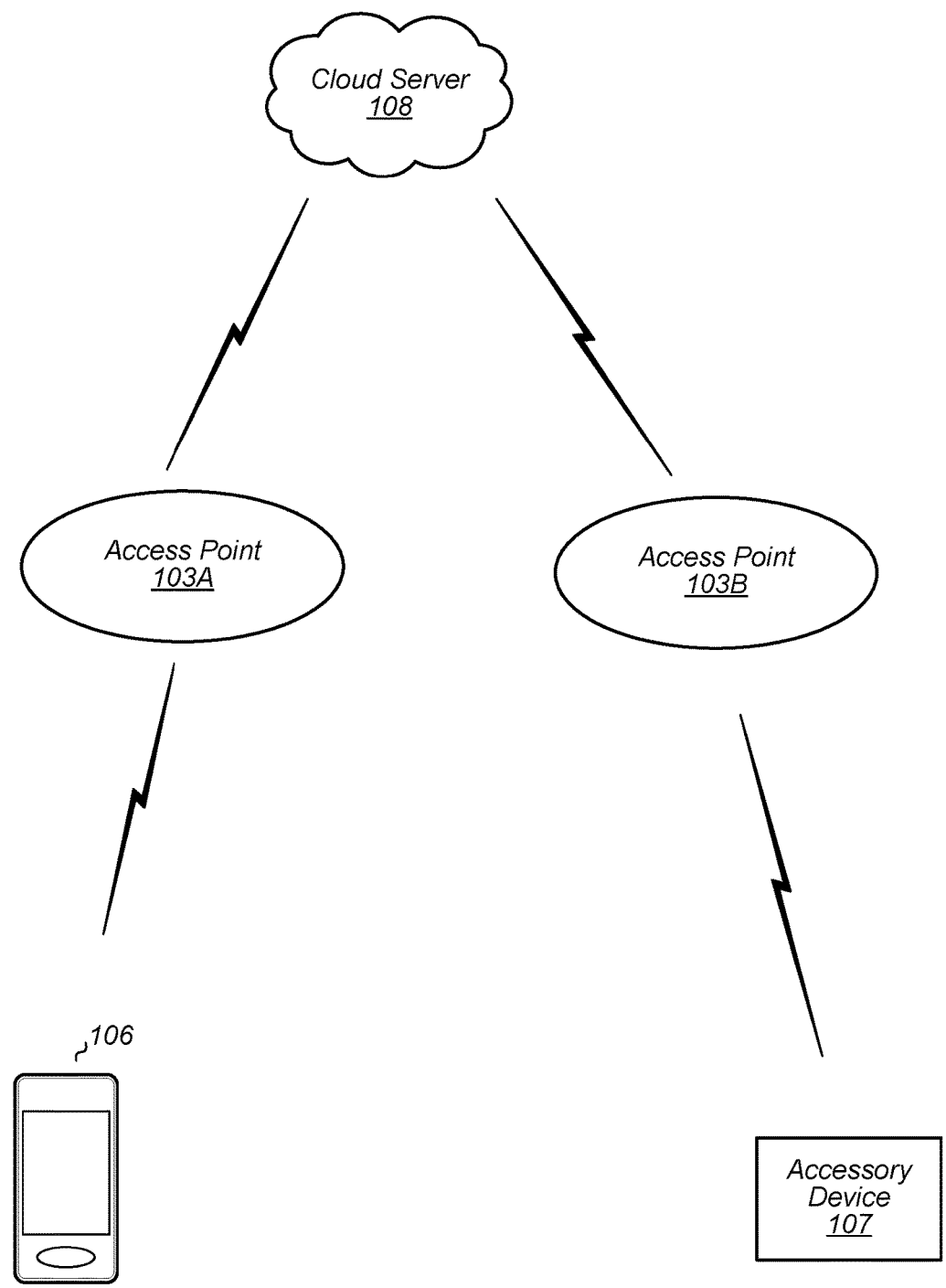
FIG. 3 illustrates an example system in which an accessory device and a companion device can communicate with each other via a cloud server.

FIG. 3—Example System with Cloud-based Message Exchange

FIG. 3 illustrates an example system where a server, referred to as a cloud server, may be used to facilitate communication between first and second UEs, e.g., between companion device 106 and accessory device 107, when the two devices are not in direct communication or connected to a common network infrastructure device (common access point). The two UEs may have a companion device/accessory device relationship, meaning that it is desired for the first UE (the companion device) and the second UE (the accessory device) to share information with each other so that they have common or synchronized user data on both devices, such as synchronized communication data (emails, texts) or synchronized media such as songs, images, videos, etc. This most commonly occurs when the two UEs are owned or used by the same user, e.g., a single user owns and uses both the smart phone and the smart watch. However, this desire may also occur where the two UEs are owned by different users, such as two people in the same family, who share access to a common media repository such as a library of songs, images, videos, etc. The term "companion device/accessory device relationship" may also mean that the companion device may have the ability to control at least certain aspects of the accessory device, such as the companion device being able to act as a communications proxy for the accessory device or performs management duties, such as data entry and registration, for the accessory device.

In this companion device/accessory device relationship, the two UEs may be configured to communicate messages with each other when the two UEs are in direct communication with each other, such as through a short range communication protocol such as Bluetooth. The two UEs may also be configured to communicate with each other when they are connected to a common network infrastructure device, e.g., if each is connected to the same base station or wireless access point.

However, if the two UEs are not directly connected and not connected to the same network infrastructure device, then they may not ordinarily be able to communicate certain types of messages to each other. As shown in FIG. 3, the companion device 106 and accessory device 107 are connected to different access points 103A and 103B. As described earlier, the accessory device 107 may be in communication with a first Wi-Fi network through a first access point 103A. The companion device 106 may be connected to a second different Wi-Fi network through a second access point 103B. Thus these two UEs are not able to directly communicate with each other (as they are too far apart) and are not able to communicate through a common network infrastructure device (a common Wi-Fi access point).

As shown, each access point 103A and 103B may also communicate through a network (such as the Internet) with a cloud server 108. In some embodiments, through communication with the access points 103A and 103B, the accessory device and the companion device may operate to communicate these certain types of messages with each other via the cloud server 108.

The two UEs may each have separately previously registered with the cloud server 108, where the cloud server may perform various functions for the UEs. For example, the cloud server may store data associated with each of the UEs, e.g., may be a repository for storing application data, music, images (e.g., photos), videos, or other types of data associated with each respective UE. The cloud server may also provide a mechanism to access functionality and/or data of the UE via the Internet. In some embodiments described herein, the cloud server 108 may also serve as a mechanism for enabling communication of these certain types of messages between the UEs.

Each UE may have previously registered with the cloud server, and thus each UE may have a "cloud account" with the cloud server. In some embodiments, the companion device may be registered with the cloud server, and the accessory device 107, by virtue of its pairing with the companion device 106, may be automatically registered to the same cloud account. The manner in which the two UEs may communicate with each other through the cloud server is discussed further below.

Figure 4:
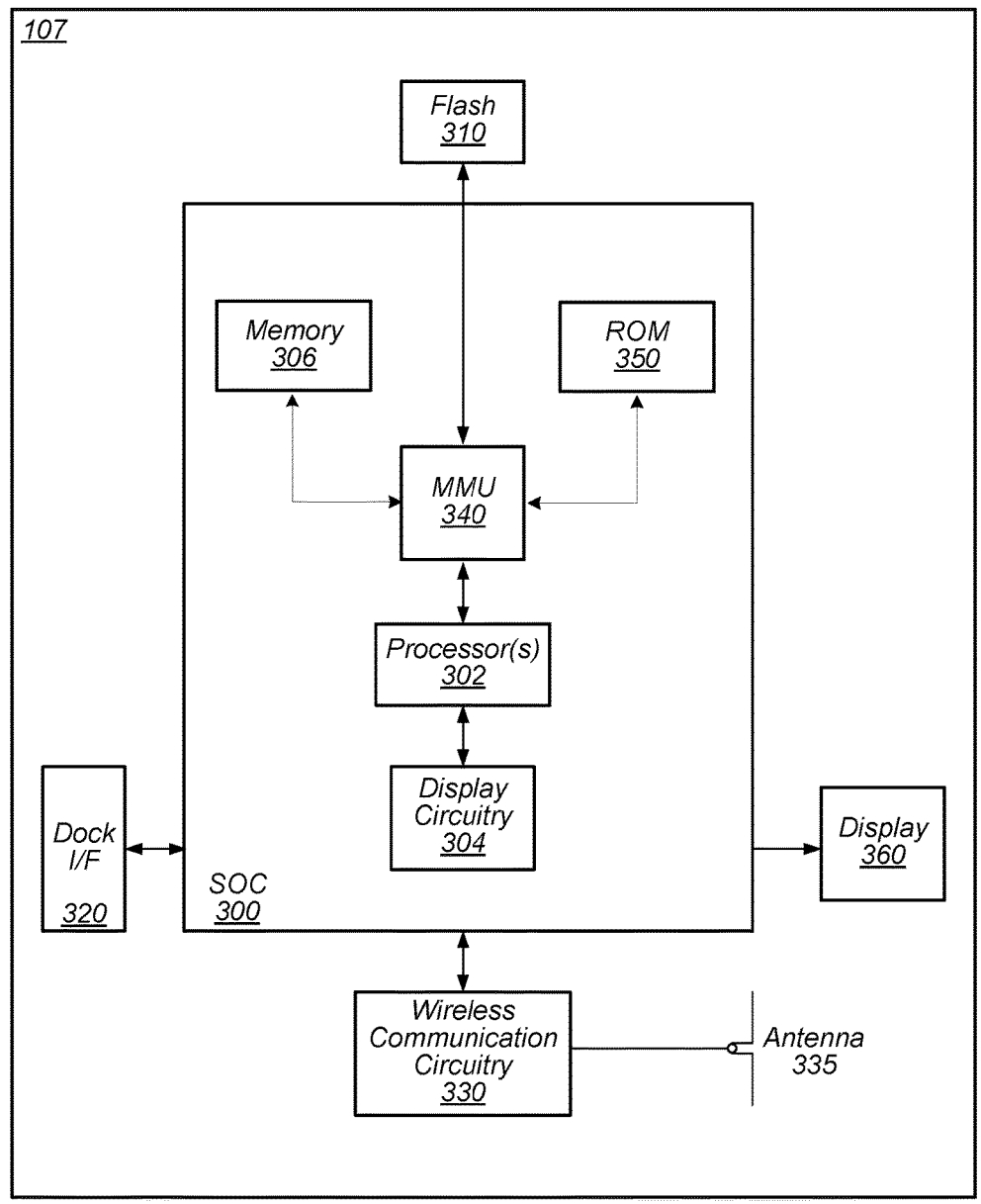
FIG. 4 is a block diagram illustrating a user equipment (UE) device, according to some embodiments.

FIG. 4—Example Block Diagram of a UE

FIG. 4 illustrates one possible block diagram of a UE, such as an accessory device 107 and/or a companion device 106. As shown, the UE 106/107 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE device 106/107 may also include other circuits or devices, such as the display circuitry 304, radio 330, connector OF 320, and/or display 360.

In the embodiment shown, ROM 350 may include a bootloader, which may be executed by the processor(s) 302 during boot-up or initialization. As also shown, the SOC 300 may be coupled to various other circuits of the UE device 106/107. For example, the UE may include various types of memory, a connector interface 320 (e.g., for coupling to a computer system), the display 360, and wireless communication circuitry (e.g., for communication using LTE, CDMA2000, Bluetooth, Wi-Fi, NFC, GPS, etc.).

The UE 106/107 may include at least one antenna, and in some embodiments multiple antennas, for performing wireless communication with base stations and/or other devices. For example, the accessory device 107 may use antenna 335 to perform the wireless communication. As noted above, the UE may in some embodiments be configured to communicate wirelessly using a plurality of wireless communication standards or radio access technologies (RATs). In some embodiments the UE may comprise two radios or more radios for communicating with different RATs. For example, the UE may comprise a first cellular radio for communicating with a cellular RAT, may comprise a second Wi-Fi radio for communicating with a Wi-Fi network, and may comprise a third radio for communicating according to a short range RAT, such as Bluetooth.

As described herein, the UE 106/107 may include hardware and software components for implementing methods according to embodiments of this disclosure. The processor 302 of the UE may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 5:
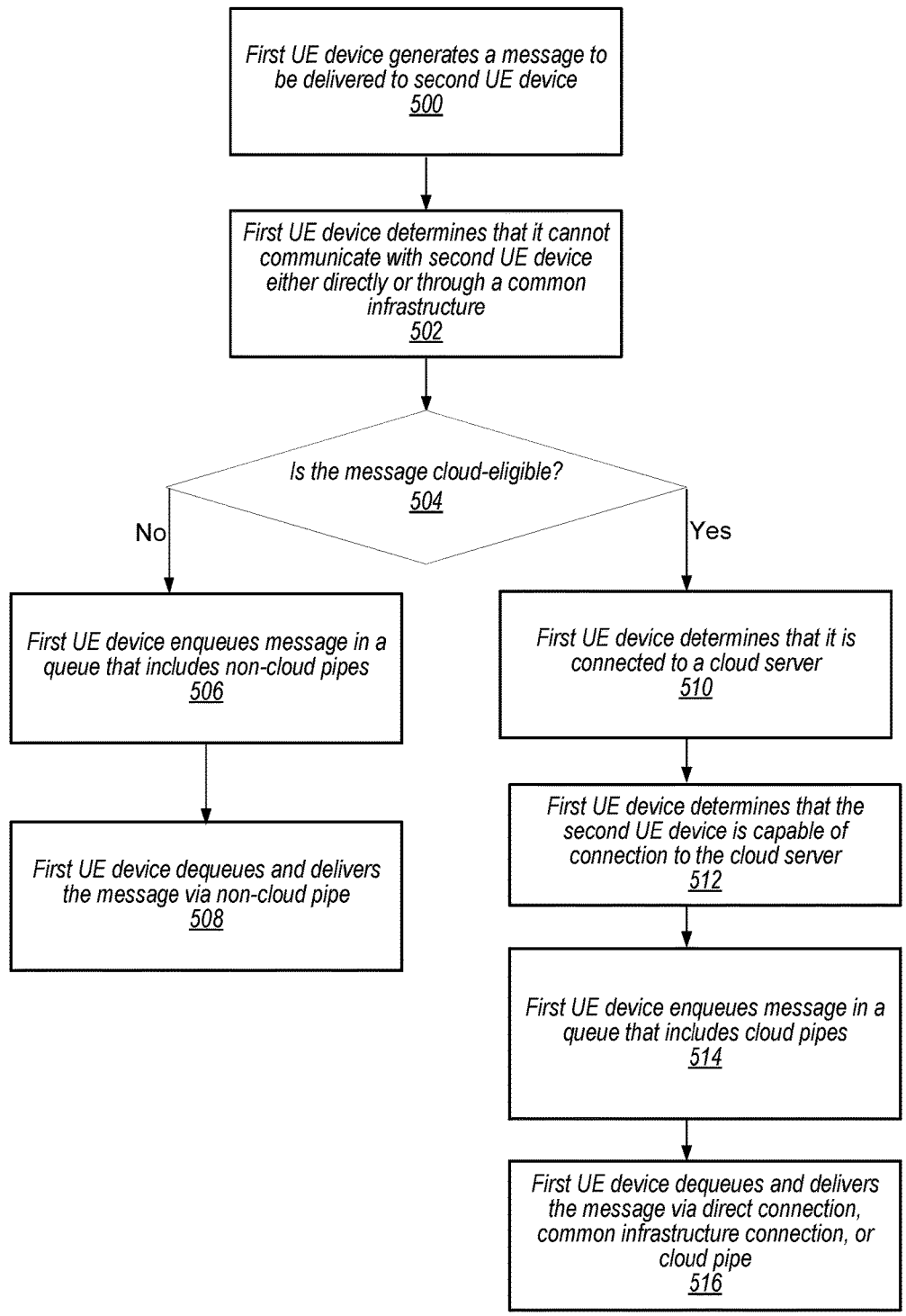
FIG. 5 is a flowchart diagram illustrating a method whereby a companion device and an accessory device may communicate with each other using various methods, including cloud based messaging, according to some embodiments.

FIG. 5—Cloud-Based Messaging

FIG. 5 is a flowchart diagram illustrating how, and under what circumstances, a message may be properly enqueued for Cloud Messaging.

At 500, the first UE device, e.g., an accessory device, generates a message for delivery to a second UE, e.g., a companion device. This message may be an email, a calendar notification, a text message or any of various other types of messages or data relayed between the two devices to help insure that the devices contain consistent user information or data. For example, where the user receives an email or text message on his accessory device, it may be desirable for the accessory device to share this email or text message with the companion device so that both devices are "in sync" with respect to email and text messages. This operation may also occur in the reverse, where the companion device receives an email or text message and desires to share these with the accessory device. As another example, a calendar notification may be indicated on one of the companion or accessory devices, and transferred to the other of the devices. Another class of messages involves synchronization of media content or media libraries, such as music, images or videos. Other types of messages are also contemplated.

At 502, the first UE device determines that it cannot communicate with a second UE device either via a direct connection, such as a Bluetooth connection, or through a common infrastructure point, such as a common access point. Given this determination, the first UE device may be configured to takes steps to send the message via cloud messaging, if possible. In some embodiments, the UE device may also be configured determine that the direct connection is not useable when the UE device is actually capable of communicating directly with the second UE device, but a signal strength of the short-range communication between the first UE device and the second UE device is below a threshold.

As shown at 504, the first UE device may determine if the message is eligible for delivery via cloud-based connection. In making this determination, many factors may be relevant. For example, this eligibility may be based upon type-level permissions and/or message-level permissions. The cloud-eligible determination in 504 may be desired such that only important messages are transmitted using the cloud server. Transmissions via the cloud server, including setting up and breaking down the cloud pipe, may involve a large amount of power consumption, and thus may reduce the battery life of the UEs, particularly the smart watch, which has a reduced battery capacity relative to the smart phone.

Type-level permissions may be permissions for the respective type of the current message, where the type may be, e.g., email, text, calendar notification, media, etc. Calendar notifications may be a type that are sufficiently important such that these notifications should be sent using the cloud server 108 if the direct or common infrastructure methods are not available. Email and text, at least for certain predesignated senders, may also be sufficiently important such that these notifications should be sent using the cloud server 108 if the direct or common infrastructure methods are not available. In contrast, media content messages, such as the synchronization of a music library or photo library, may not be sufficiently important for cloud server transfer, but rather may be required to wait for either a direct connection or connection to a common infrastructure device.

Message-level permissions may comprise permissions of the current respective message, or the individual, particular permissions of the current message, and other possible factors, within a given type. Examples of message-level permissions include those for email messages, where the user may have configured a certain class of users, such as family members or co-workers (e.g., the user's boss) with a higher priority such that emails from this configured class are deemed sufficiently important such that they should be sent via the cloud server 108 if the direct or common infrastructure methods are not available. Emails for other types of users, e.g., emails from marketers or advertisers, or other routine emails, may not be sufficiently important to be sent over the cloud server.

If the message is determined to be ineligible for cloud messaging in 504, then in 506 the first UE device may enqueue the message in a first set of queues. This first set of queues may be configured to pass messages into either the direct connection pipe or common infrastructure connection pipe. The particular queue to which a message is added may be determined based upon factors such as the priority level of the message. For example, calendar notifications or emails marked urgent may be enqueued in an "urgent queue," meaning that these notifications will be sent fairly quickly, possibly as soon as possible. Other emails that are not marked urgent may be enqueued in a "default queue," and may be sent when convenient, e.g., when there are low bandwidth requirements from other functions. For those lower priority emails placed in the default queue, the system may send a notification via the cloud server to the other UE that there is an incoming message, but may only transfer the actual email content via the cloud server if the user indicates a desire to see the email. Larger files, such as photos, videos, and music tracks may be enqueued in a "sync queue," and these may be sent when there is little or no other activity, such as at night time. Thus, messages of higher priority may be prioritized over messages of lesser priority, by preferentially dequeuing and delivering from higher priority queues prior to dequeuing and delivering from lower priority queues.

At 508 the message which has been placed in one of the queues (enqueued) may be then dequeued and delivered via either the direct connection pipe or the common infrastructure connection pipe when they become available, and also based on the relative priority of the queue as discussed above.

If, however, the message is eligible to be sent via cloud messaging, also referred to as 'cloud-eligible', as determined in 504, then in 510 the first UE device determines that it is (or whether it is) connected to a cloud server (this connection may exist, for example, through a cloud account and a connection to a Wi-Fi hotspot).

In 512 the first UE determines whether second UE device has been registered with (or is capable of connecting to) the cloud server. If the second UE (the recipient UE) is not capable of connecting to the cloud server, then operation may proceed to steps 506 and 508 as discussed above. If both of the UEs are capable of connecting to the cloud server, then operation proceeds to 514.

As shown at 514, following this determination regarding cloud server connections, the first UE device may enqueue the message in a queue in a second, independent set of queues, for delivery via direct pipe, common infrastructure pipe or cloud pipe. Thus for the second set of queues the sending UE may be configured to relay messages through either of the two pipes used by the first set of queues, as well as through the cloud pipe. The direct pipe and the common infrastructure pipe in the second set of queues may have selection criteria similar to that described above for the first set.

At 516 the message, having been enqueued in one of the queues in the second set of queues in 514, may be subsequently dequeued and delivered via the direct connection pipe, the common infrastructure connection pipe, or the cloud pipe.

In some embodiments, when the message is enqueued in the second set of queues including the cloud pipe in 514, given that the direct connection pipe and the common infrastructure connection pipe are not available as determined in 502, in 516 the first UE may attempt to establish the cloud pipe, i.e., a connection to the second UE via the cloud server. If the cloud pipe is successfully established then messages will start flowing over the cloud pipe. If the second UE is not currently connected to the cloud server, then the cloud pipe may not be established, and the message may remain in the second set of queues waiting for the first available delivery mechanism to become available. Thus, for example, if the companion device (smart phone) is attempting to send a message to the accessory device (smart watch), and the other connections are not available, the phone will attempt to establish a connection with the watch using the cloud pipe. If the cloud pipe is successfully established then messages will start flowing from the phone to the watch (and possibly from the watch to the phone as well). If the cloud pipe is not successfully established then the messages will remain enqueued waiting for a delivery mechanism.

If the cloud pipe is not available to be established after the message has been enqueued, then the UE may attempt to establish the cloud pipe at a later time, such as periodically or based on certain conditions, until the message has been sent.

In other embodiments, if the direct connection pipe and the common infrastructure connection pipe are not available, then the message may be relayed through to the cloud server regardless of whether a complete cloud pipe can be established at that time, i.e., regardless of whether the second UE is currently connected to the cloud server. In other words, in this embodiment the first UE may transmit the message to the cloud server, via the access point and the network, and the second UE device may later receive the message upon connecting to the cloud server via the shared cloud account.

Figure 6A:
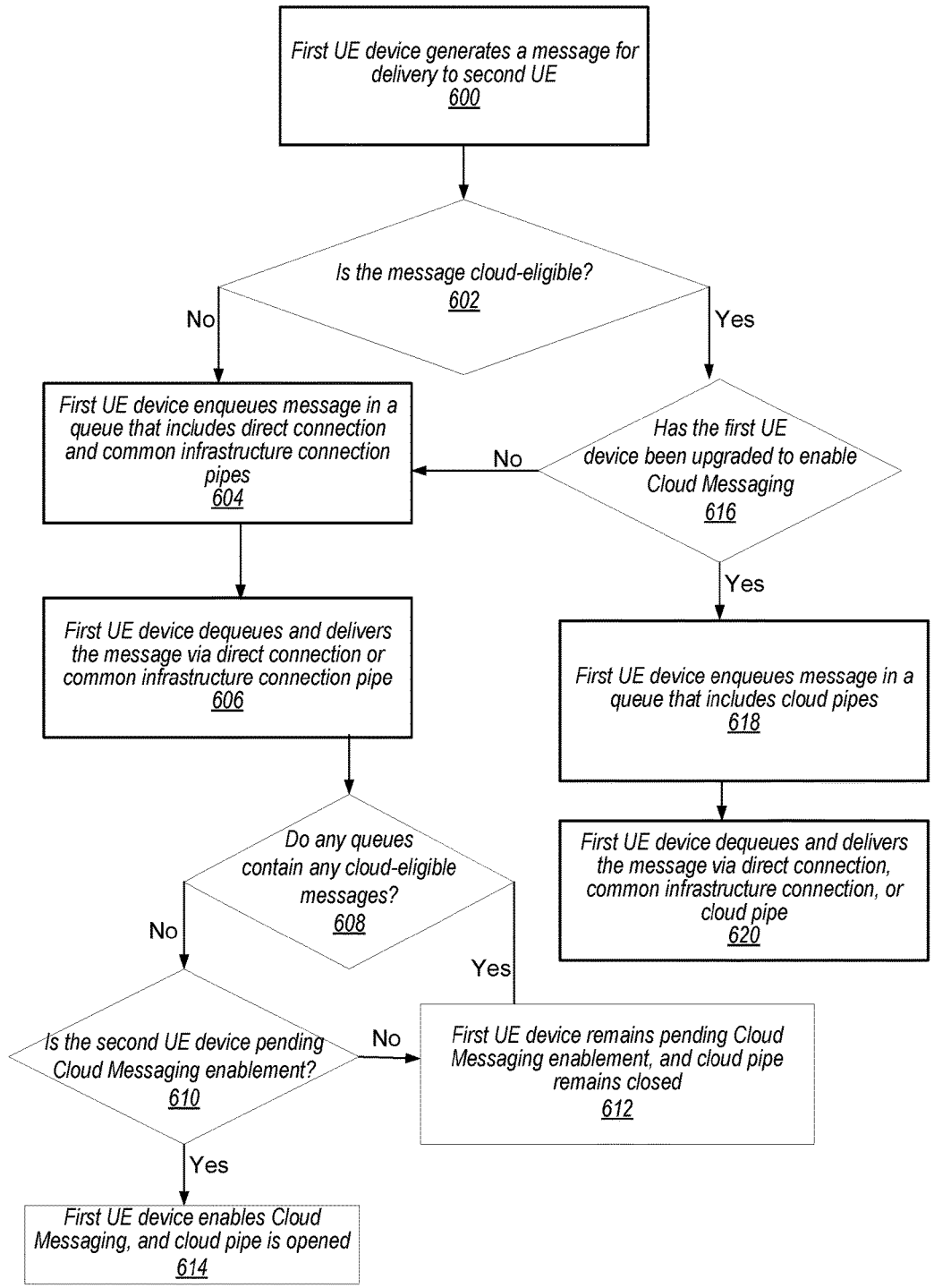
FIGS. 6A and 6B are flowchart diagrams illustrating operation when a companion device and an accessory device are updated to enable cloud based messaging at different times.
Figure 6B:
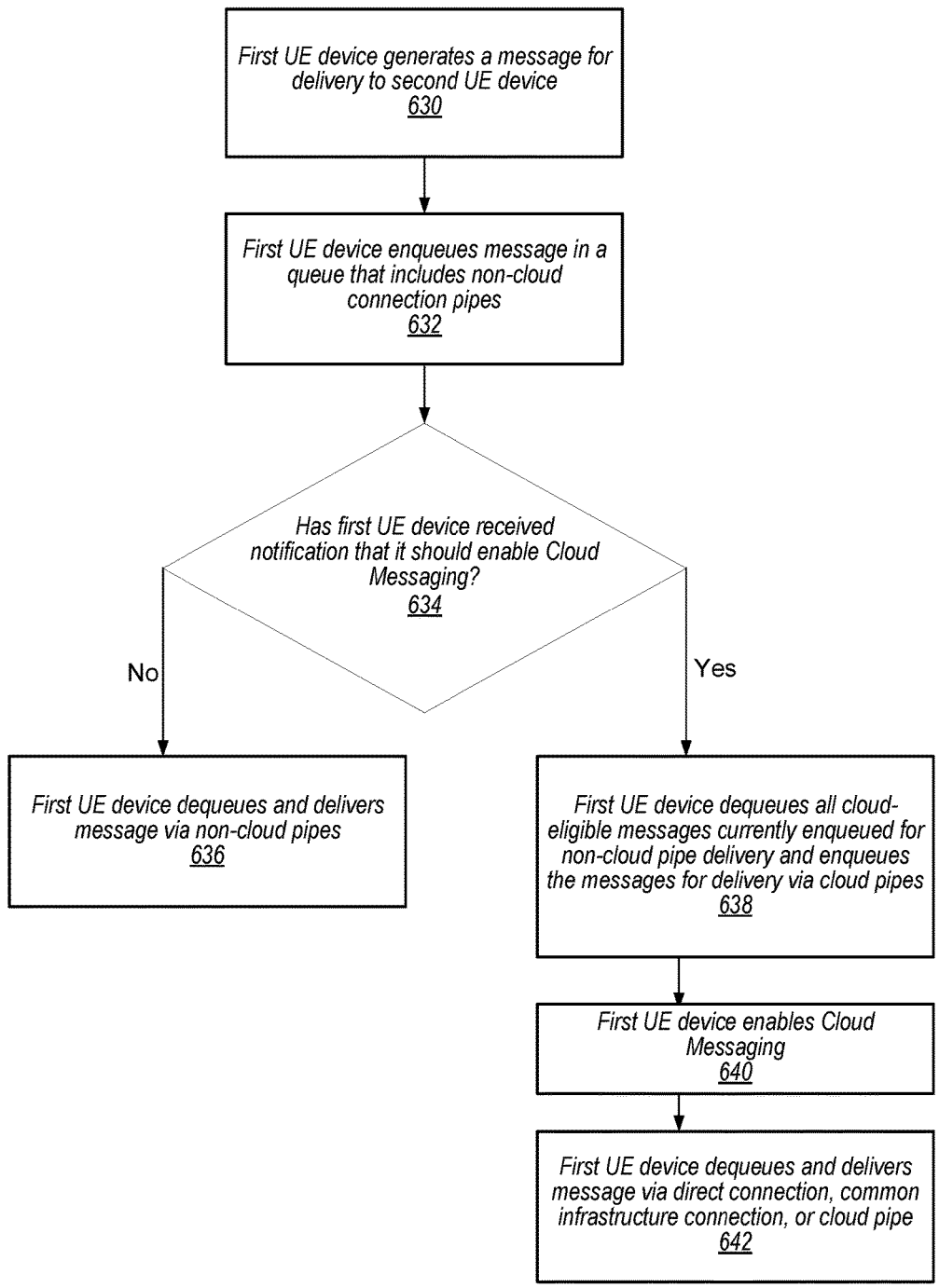

FIGS. 6A and 6B—Upgrading to Enable Cloud-Based Messaging

FIGS. 6A and 6B are flowchart diagrams illustrating methods whereby one of the UEs, e.g., a companion device or an accessory device, has been updated to enable cloud messaging as described above, and the other UE has not. This may occur when one of the UEs is updated with a new version of its operating system that includes cloud messaging, but the other UE has not been updated and still remains on an older operating system that does not support cloud messaging. When one UE device has been updated to support cloud messaging, and the other UE has not been updated, then the cloud-based pipes cannot be used. In other words, the traditional pipes (non-cloud pipes) can be used, but the cloud-based pipes cannot be used, since the pipes have a one-to-one matching on each side.

In the situation where a first UE device is updated to enable cloud messaging and the second UE device is updated at a later time, a potential problem may arise where the UE that is cloud-messaging capable may have already enqueued messages on a non-cloud enabled pipe that it desires to have delivered in a certain order. Thus in some embodiments the UE may monitor the non-cloud enabled pipe and set a flag indicating that the second UE device is "pending" the switch over to cloud messaging. When all current messages tagged as cloud-capable have been dequeued, the first UE may then enable the cloud pipe and have these messages flow through the cloud pipe from that point onwards. This operates to maintain an ordering of the messages.

FIG. 6A describes a situation for appropriately handling the situation in which a companion device has been upgraded to enable cloud messaging, but the paired accessory device has not been contemporaneously upgraded/enabled, but rather is updated at a later time. Thus, a cloud-based connection cannot yet be used to deliver messages between the two devices. The diagram outlines a method by which cloud messaging may be safely enabled on the companion device, meaning no messages are lost in transition and message ordering is preserved, after the accessory device has signaled its readiness to receive and deliver via the cloud pipe.

At 600, the first UE device, e.g., a companion device, generates a message for delivery to a second UE device, e.g., an accessory device. This message may be an email, a calendar notification, or any of various other types of messages relayed between the two devices.

At 602, the first UE device may determine if the message is cloud-eligible. As described previously, this eligibility may be based at least in part upon message-level and/or type-level permissions. If the first UE device determines that the message is indeed cloud-eligible, and both UE devices have been upgraded to enable cloud messaging as determined in 616, then in 618 the first UE device may add the message to one of one or more queues for delivery via any one of direct connection, common infrastructure connection, and cloud-based connection delivery mechanisms, or pipes. At 620 the message may be subsequently dequeued and delivered via one of the aforementioned pipes. This is similar to the operation described above with respect to FIG. 5.

If the message is not cloud-eligible in 602 or the first UE device has not been upgraded to enable cloud messaging in 616, then in 604 the first UE device may add the message to one of one or more queues for delivery via direct connection or common infrastructure connection (non-cloud pipes). In 606 the message may be subsequently dequeued and delivered via one of the two previously mentioned non-cloud pipes.

Following delivery of the message by direct connection or common infrastructure connection, at 608 the first UE device may determine if any of the currently enqueued messages are cloud-eligible. If none of the enqueued messages are cloud eligible in 608, in 610 the first UE device determines if the second UE is pending cloud messaging enablement, meaning that the second UE has recently had cloud messaging enabled, but it is not yet being used.

If the second UE is pending cloud messaging enablement, then the first UE device may enable cloud messaging, effectively opening the cloud pipe, making it available as a means of delivery, and allowing messages to be enqueued in the second set of queues. In this case, all of the prior cloud-eligible messages were determined to have been flushed in 608 and thus cloud messaging is enabled only after all of these cloud-eligible messages were flushed out of the queue. This helps to ensure proper ordering of these cloud-eligible messages.

If cloud-eligible messages still remain enqueued as determined in 608, or the second UE device is not pending cloud messaging enablement, meaning that the second device has not had cloud messaging enabled (an OS upgrade has not yet occurred), then the cloud pipe remains closed, keeping it unavailable as a means of delivery and the second set of queues remains unavailable, as shown at 612.

FIG. 6B describes another method of handling the situation in which a companion device has been upgraded to enable Cloud Messaging, but the paired accessory device is not yet upgraded/enabled, or is updated at a later time. Thus, a cloud-based connection cannot yet be used to deliver messages between the two devices. The diagram outlines a method by which cloud messaging may be safely enabled on the accessory device, meaning no messages are lost in transition and message ordering is preserved.

At 630, the first UE device, e.g., an accessory device, generates a message for delivery to a second UE device, e.g., a companion device. This message may be one of a variety of message types, as described above.

At 632 the first UE enqueues the message for non-cloud connections, e.g., including direct connection and common infrastructure connection pipes. More specifically, at 632 the UE places the message in a queue that includes direct connection and common infrastructure connection pipes.

At 634 the first UE device determines if it has received a notification (such as a notification delivered from the companion device) to enable cloud messaging. If so, then at 638 the first UE device checks all queues for direct and common infrastructure pipes for messages which are cloud-eligible, as determined by message-level and/or type-level permissions. The first UE device then removes all cloud-eligible messages from those queues and adds those messages to one of the cloud pipes, e.g., one or more queues for direct, common infrastructure, and cloud pipes, as shown at 638.

Once the first UE device has moved the cloud-eligible messages from the non-cloud queues to the appropriate cloud-eligible queues in 638, in 640 the first UE device may enable cloud messaging. After cloud messaging is enabled in 640, cloud-eligible messages may begin to be delivered via cloud pipes in 642.

If the first UE device has not received a notification to enable cloud messaging, then at 636 the generated message is added to a queue for the non-cloud pipes, i.e., the direct and common infrastructure pipes.

One embodiment may comprise:

1. A user equipment (UE) device, comprising:

at least one antenna for performing wireless communication;

at least one radio coupled to the at least one antenna, wherein the at least one radio is configured to perform communication with an access point and short-range communication with a companion device; and one or more processors coupled to the at least one radio, wherein the one or more processors and the at least one radio are configured to perform wireless communications using the at least one antenna;

wherein the UE device is configured to:

store a plurality of messages in a first memory queue intended for delivery to a second UE device, wherein the UE device is associated with the second UE device such that the UE device and the second UE device share information associated with a user, wherein the memory queue allows for a plurality of delivery options including cloud-based messaging;

determine that the second UE device has been updated to enable cloud-based messaging;

in response to determining that the second UE device has been updated to enable cloud-based messaging, transfer the plurality of messages in the first memory queue to the second UE device prior to enabling a cloud pipe in the UE device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna for performing wireless communication;
   at least one radio communicatively coupled to the at least one antenna; and
   one or more processors communicatively coupled to the at least one radio, wherein the one or more processors and the at least one radio are configured to perform wireless communications using the at least one antenna;
   wherein the UE is configured to:
     generate a message intended for a second UE, wherein the UE and the second UE share information associated with a user account;
     determine that the UE cannot communicate with the second UE either directly or through a common network infrastructure device;
     determine that the message is eligible for delivery through a cloud server; and
     enqueue the message in one or more queues, wherein the one or more queues are configured to pass messages to the second UE at least through a cloud-based connection with the cloud server.

2. The UE of claim 1, wherein the UE is further configured to:
   determine that the second UE is capable of connecting to the cloud server prior to enqueuing the message in the one or more queues.

3. The UE of claim 1, wherein the UE is further configured to:
   periodically attempt to establish a cloud pipe useable to transmit the message to the second UE.

4. The UE of claim 1,
   wherein the UE is configured to determine that the message is eligible for delivery through the cloud server based on one or more factors, including a type-level permission and/or a message-level permission of the message.

5. The UE of claim 1, wherein the UE is further configured to:
   determine if the second UE is currently connected to the cloud server; and
   establish a communication pipe between the UE and the second UE through the cloud server in response to determining that second UE is currently connected to the cloud server.

6. The UE of claim 1,
   wherein the UE is further configured to relay the message to the cloud server regardless of whether the second UE is currently connected to the cloud server.

7. The UE of claim 1,
   wherein the one or more queues are further configured to pass messages to the second UE through at least one of a direct connection or a connection using the common network infrastructure device.

8. The UE of claim 1,
   wherein the UE comprises a smart phone and the second UE comprises a wearable device.

9. The UE of claim 1,
   wherein the enqueued message is subsequently dequeued and delivered to the second UE via the cloud-based connection with the cloud server.

10. A non-transitory computer-accessible memory medium comprised in a user equipment device (UE),
    wherein the memory medium stores a message intended for a second UE, wherein the second UE is associated with the UE in a companion device—accessory device relationship;
    wherein the memory medium stores program instructions executable to:
      determine that the UE cannot communicate with the second UE either directly or through a common network infrastructure device;
      determine that the message is eligible for delivery through a cloud server; and
      enqueue the message in one or more queues, wherein the one or more queues are configured to pass messages to the second UE at least through a cloud-based connection with the cloud server.

11. The non-transitory computer-accessible memory medium of claim 10, wherein the program instructions are further executable to:
    determine that the second UE is capable of connecting to the cloud server prior to enqueuing the message in the one or more queues.

12. The non-transitory computer-accessible memory medium of claim 10, wherein the program instructions are further executable to:
    periodically attempt to establish a cloud pipe useable to transmit the message to the second UE.

13. The non-transitory computer-accessible memory medium of claim 10,
    wherein the program instructions are further executable to determine that the message is eligible for transmission through the cloud server based upon one or more factors, including at least one of a type-level permission or a message-level permission.

14. The non-transitory computer-accessible memory medium of claim 13,
    wherein the one or more factors comprise a permission that calendar notifications are cloud eligible.

15. The non-transitory computer-accessible memory medium of claim 13,
    wherein the one or more factors comprise a type-level permission that specifies that media synchronization operations are not cloud eligible.

16. The non-transitory computer-accessible memory medium of claim 13,
    wherein the one or more factors comprise a message-level permission, wherein the message-level permission specifies that email communications to a first group of users are cloud eligible.

17. A method for operating a user equipment device (UE), the method comprising:
    generating a message intended for a second UE, wherein the UE and the second UE share information associated with a user account;
    determining that the UE cannot communicate with the second UE either directly or through a common network infrastructure device;
    determining that the message is eligible for delivery through a cloud server, wherein the cloud server stores data for both the UE and the second UE; and
    enqueueing the message in one or more queues, wherein the one or more queues are configured to pass messages to the second UE at least through a cloud-based connection with the cloud server.

18. The method of claim 17, the method further comprising:
    determining that the second UE is not currently connected to the cloud server; and
    keeping the message in the one or more queues until a delivery mechanism becomes available.

19. The method of claim 17, the method further comprising:
    periodically attempting to establish a cloud pipe useable to transmit the message to the second UE.

20. The method of claim 17,
    wherein the one or more queues are further configured to pass messages to the second UE through at least one of a direct connection or a connection using the common network infrastructure device.

* * * * *